(No Model.)
2 Sheets—Sheet 1.

S. P. TALLMAN.
STOCK CAR.

No. 288,680. Patented Nov. 20, 1883.

WITNESSES:
Geo. H. Fraser.
C. K. Fraser.

INVENTOR:
Stephen P. Tallman
By his Attorneys,
Burke, Fraser Hornett (No Model.) 2 Sheets—Sheet 2.

S. P. TALLMAN.
STOCK CAR.

No. 288,680. Patented Nov. 20, 1883.

WITNESSES:
Geo. H. Fraser.
C. K. Fraser.

INVENTOR:
Stephen P. Tallman
By his Attorneys,
Burke, Fraser & Connett

UNITED STATES PATENT OFFICE.

STEPHEN P. TALLMAN, OF DUNELLEN, NEW JERSEY.

STOCK-CAR.

SPECIFICATION forming part of Letters Patent No. 288,680, dated November 20, 1883.

Application filed August 23, 1883. (No model.)

*To all whom it may concern:*

Be it known that I, STEPHEN P. TALLMAN, a citizen of the United States, and a resident of Dunellen, in the county of Middlesex and State of New Jersey, have invented certain Improvements in Stock-Cars, of which the following is a specification.

My invention relates to a car for transporting live stock, especially horned cattle and mules; and it is particularly well adapted to cars without stalls, where the cattle are not separated in any way.

The object of my invention is, primarily, to provide a magazine for the storage of hay sufficient to last the cattle during the entire trip, and to provide a means whereby they may be readily watered at any point on the route.

My invention consists, in part, in providing an ordinary car with a double roof, thus leaving a space between the upper and lower roofs for hay, with register-slats in the lower or inner roof, through which the hay may be drawn down by the animals in feeding, in the place of the hay-racks in the cars, as heretofore used. A register-slide permits the openings to be closed at any time, if desired.

Another feature of the invention relates to the water-troughs, which are outside of the car, and hinged to the car-sides at their inner edges, so as to be turned up close to the sides of the car and emptied. These troughs are supplied with counterbalance slides or weights, which drop and mask the troughs normally, and prevent the animals from soiling them.

Heretofore stock-cars have been provided with hay-racks at the sides, and with magazines for feed, and I do not broadly claim this; nor do I broadly claim the troughs hinged or pivoted to the car, as these have been before proposed to be arranged in various ways. My construction differs from all of these, as will be set forth hereinafter.

Figure 1:
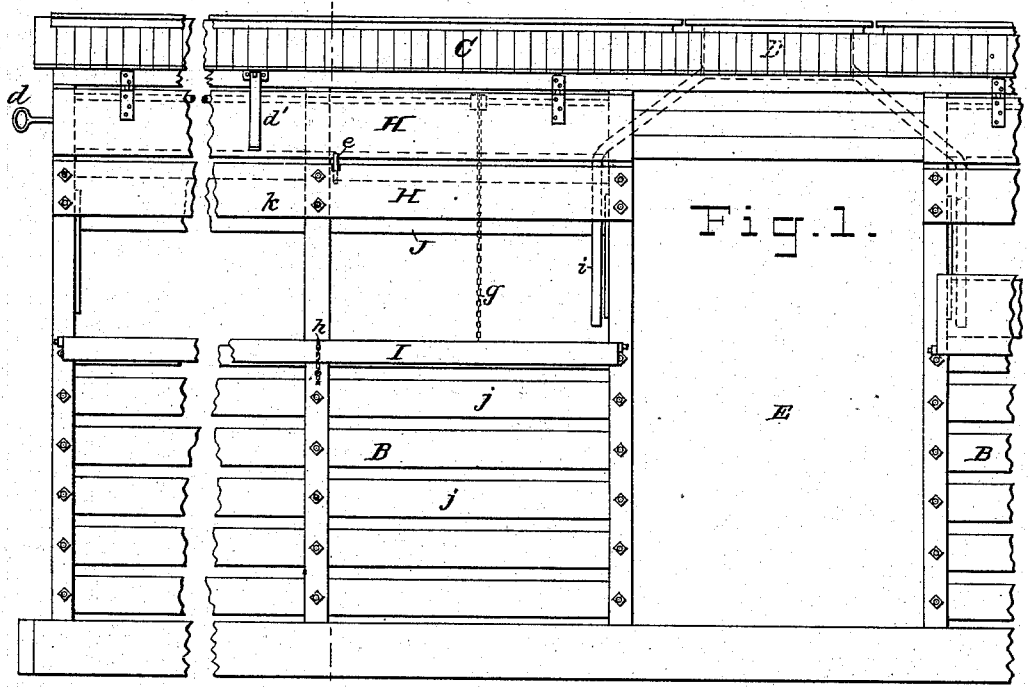
Figure 2:
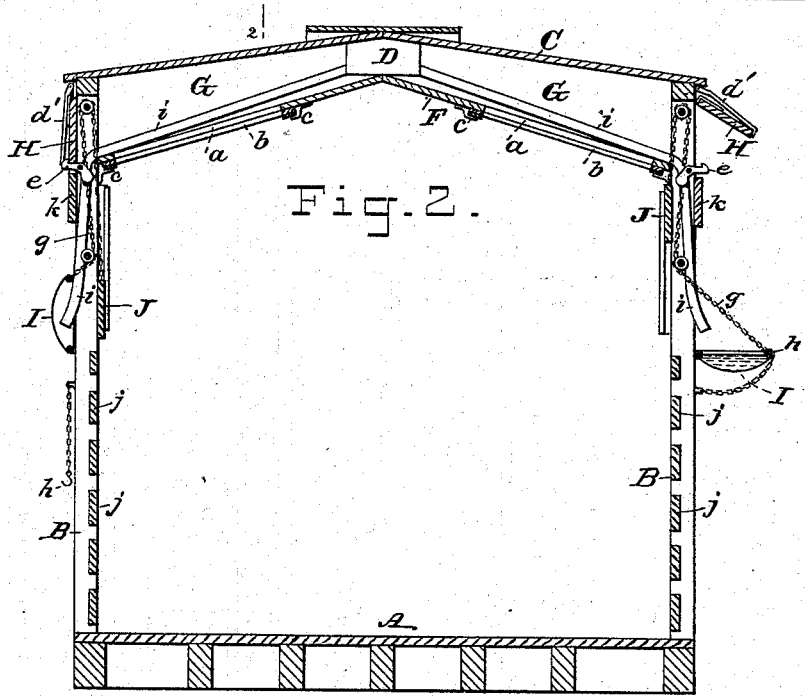
Figure 3:
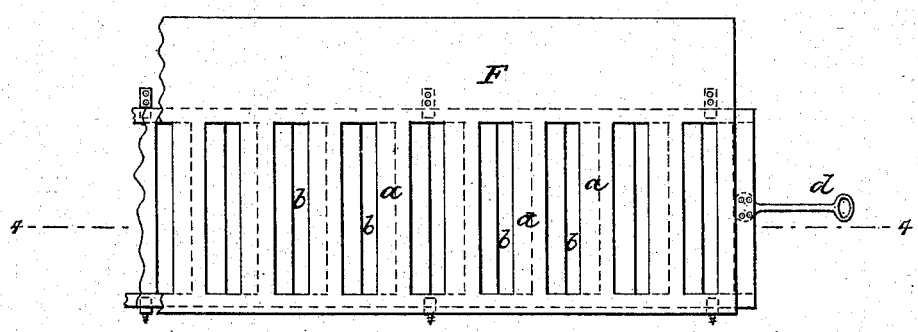
Figure 4:
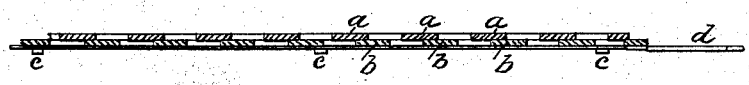
Figure 5:
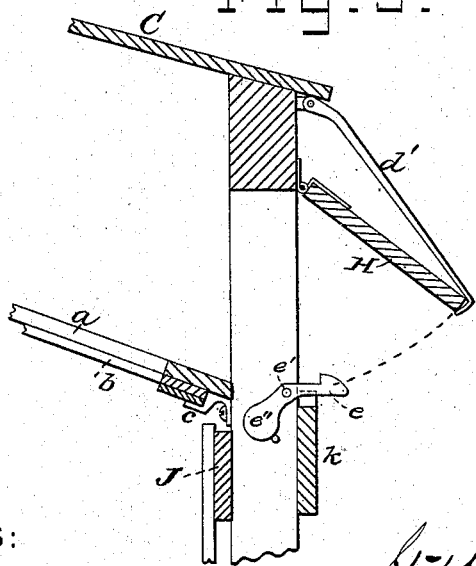

In the drawings, which serve to illustrate my invention, Figure 1 is a side elevation, showing the middle and end of a car provided with my improvements. Fig. 2 is a cross-section of the same. Fig. 3 is a detached view designed to show the construction of the slatted portion of the lower roof of the car, with its register-slide. Fig. 4 is a section on line 4 4 in Fig. 3. Fig. 5 is a detached and enlarged view, showing the gravity-catch to hold the door of the magazine and the adjacent parts.

Referring to the drawings, A represents the floor of the car; B B, the sides, preferably slatted horizontally up to about four feet from the floor; C, the roof, constructed in the usual way; and D, a water-receiver let into the roof at about the middle of the car and opposite the door-openings E. This receiver is indicated in dotted lines in Fig. 1.

F is a false roof arranged in the car at the desired distance to form a suitable magazine, G, to receive hay. This roof is slatted for about two-thirds of the way, by preference from the car side to the center, being made up of narrow slats ($a\ a$ in Figs. 3 and 4) placed at a little distance apart, so that the cattle may, when the spaces between the slats are open, pull down and feed on the hay; but in order to prevent them from pulling down more than is necessary and getting it under foot, I provide a register-slide, made also of slats, $b\ b$, and mounted to play in keepers $c\ c$ on the under side of roof F, as best shown in Figs. 3, 4, and 5. This slide is provided with some form of handle, $d$, which projects through the end of the car, as shown in Fig. 1, so that the slide may be shifted by the attendant from the outside. The hay is introduced at doors H H at the side of the car. These doors are hinged at their upper edges, and when opened out, as shown at the right in Fig. 2 and in Fig. 5, are sustained by long hooks $d'\ d'$, hung to the car a little higher up. When the door is released from this hook, it falls and its lower edge wipes over and is caught by a gravity-hook, $e$, hung in the side of the car and weighted at its inner end. These hooks are best illustrated in the detached and enlarged view, Fig. 5. It will be seen, by referring to the left side of Fig. 2, that the hook $d'$ hangs against the outside of the door H when the latter is closed. As the door is lifted it lifts the hook until, when the door reaches its fully-open position, the end of the hook drops over its edge. Then when the door is dropped its edge catches against the hook and it is upheld at the desired angle. In order to close the door, it is only necessary to throw up the hook, when the door at once falls. By my arrangement of the hook the manipulations are very simple and may be performed wholly with the pitchfork or other implement.

I am aware that hooks have been provided for holding car-doors open by hooking under them; but their construction and arrangement have been such that both hands must be used in connecting them. My construction of hay-loft confines the hay to the space between the two roofs, and saves in the lower portion of the car the space heretofore occupied by hay-racks arranged at intervals. These hay-racks have heretofore been supplied from a hay-loft overhead; but such hay-loft has never, so far as I am aware, been provided with narrow openings in its floor through which the cattle below may draw the hay, but only with large openings into the feed-racks, through which the hay may be pushed down by the attendant. My construction renders the car more roomy and comfortable for the cattle, and they require less attention than when transported in the cars heretofore used.

When water-troughs are arranged within the car and at a low enough level for the cattle to drink therefrom, the cattle are apt to soil the troughs, and this is particularly liable to occur in cars where the animals are loose or unconfined in stalls. My arrangement of the troughs is intended to obviate this, as well as to provide a trough that is convenient to handle from the outside of the car. This arrangement I will now describe.

I I are the troughs, made, by preference, from galvanized iron. These are hinged at their inner edges to the uprights or studs at the sides of the car, and at about the level of the upper edges of the sides B. The trough, when not in use, is turned up, as shown at the left in Fig. 2, and when in use it is turned down outwardly, as at the right in Fig. 2 and in Fig. 1. The trough is provided with a weight, J, connect d to the outer edge of the trough by a chain or other flexible connector, $g$, which passes over guide-sheaves, as shown. The weight J is, by preference, sufficiently heavy to draw the trough up to the position shown at the left in Fig. 2, and to hold it there, and when down, as shown at the right in Fig. 2, it is held by a hook, $h$, secured by a chain or rod to the side of the car. In lieu of this hook $h$, however, the weight J, when up, may be supported by a pin inserted in a hole in the side of the car.

I prefer, for reasons that will be given, to employ for the weight J a board of about the same length as the trough, and connected to the latter by two or more chains, $g$. When the trough is down, this board is raised, and the animals may protrude their heads from the side of the car and drink at the trough; but when the trough is turned up this board is lowered far enough to serve as a screen to prevent the cattle from soiling the trough. The board or weight may be guided at its ends in suitable keepers, and, if necessary, fastenings may be provided to prevent the animals from raising it by getting their horns under it.

When the trough is turned up after use, the water remaining in it is dumped or spilled on the outside of the car. The trough is made shallow and hinged at its inner edge, in order that when turned up it will not project materially from the side of the car.

The water is taken into the receiver D at water-stations on the road, and flows to the troughs through pipes $i$ $i$, which may be arranged in any way desired. The trough, by preference, houses the end of the water-pipe when it is turned up.

I do not wish to limit myself to the precise construction and arrangement of parts herein shown, as these may be varied somewhat without departing materially from my invention—as, for example, the handle $d$ of the register-slide need not project through the end of the car. An opening may be made in the end of the car, whereby said handle can be reached. In place of making the slats $b$ $b$ to slide, each slat $b$ may be hinged at its edge to a slat, $a$, and all of slats $b$ be coupled to a rod arranged to play longitudinally, somewhat in the manner of shutter-slats. Openings may also be made in the roof C, for access to the magazine G.

It will be observed that the lower slats, $j$, of the sides of the car are secured to the inside of the studs in the usual way; but in order to give the cattle more head-room in reaching the trough I arrange the slat or slats $k$ above the trough, on the outside of the studs. This is best shown in Fig. 2.

Having thus described my invention, I claim—

1. A stock-car provided with a double roof, substantially as shown, the inner or lower roof being provided with narrow openings through which the cattle may draw the hay, substantially as set forth, thereby dispensing with hay-racks projecting into the car.

2. A stock-car provided with a double roof, forming a magazine, G, and the lower roof, F, provided with narrow openings through which the cattle may draw the hay, and a register-slide or its equivalent, to close said openings, all arranged to operate substantially as set forth.

3. A stock-car provided with troughs I, hinged at their inner edges to the outside of the car, and provided with counter-weights and fastenings, substantially as shown and specified.

4. The combination, in a stock-car, of the door H, hinged to the side of the car and opening outwardly, and the long hook $d'$, hinged to the outer side of the car, above the point where the door is hinged, hanging with its end against the door as the latter is lifted, and adapted to drop over and automatically engage the free edge of the door when the latter is lifted, and thereby to hold it open, substantially as set forth.

5. In a stock-car, the combination, with the trough hinged to the side of the car and the flexible connectors $g$, of the board J, arranged to serve as a counter-weight and screen for the trough, as set forth.

In witness whereof I have hereunto signed my name in the presence of two subscribing witnesses.

STEPHEN P. TALLMAN.

Witnesses:
HENRY CONNETT,
GEORGE H. FRASER.